Figure 1:
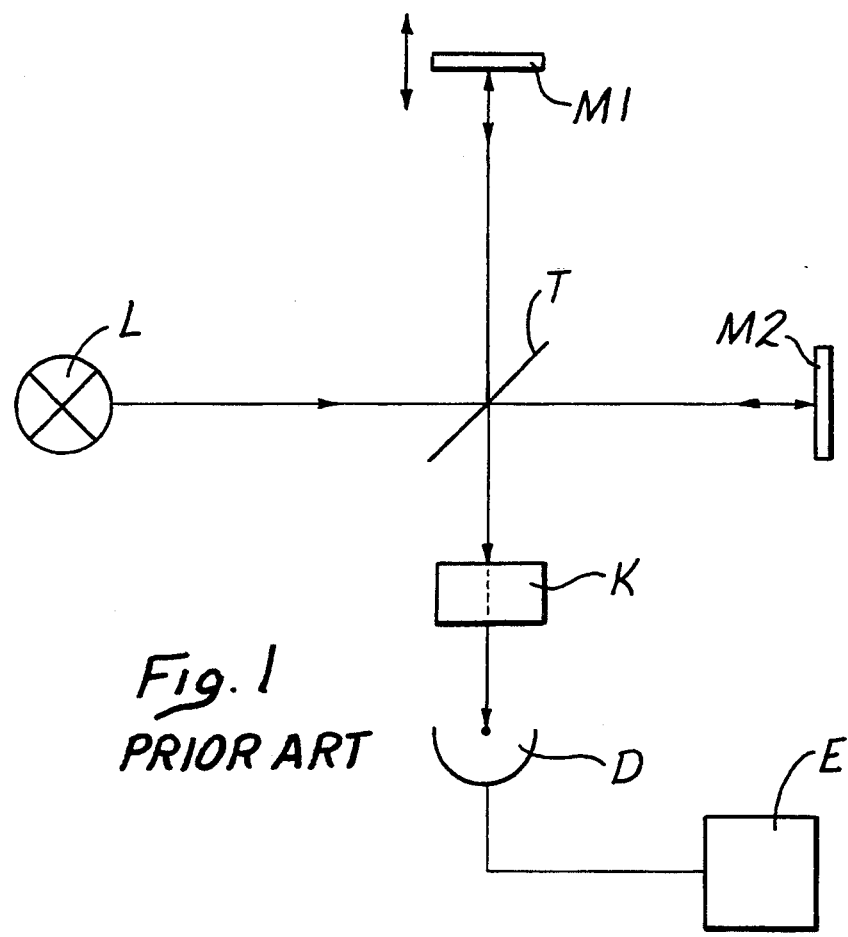

United States Patent [19]

Zöchbauer

[11] Patent Number: 5,357,340
[45] Date of Patent: Oct. 18, 1994

[54] METHOD FOR SPECTROSCOPY USING TWO FABRY-PEROT INTERFERENCE FILTERS

[75] Inventor: Michael Zöchbauer, Oberursel, Fed. Rep. of Germany

[73] Assignee: Hartmann & Braun, Fed. Rep. of Germany

[21] Appl. No.: 838,771
[22] PCT Filed: Oct. 1, 1990
[86] PCT No.: PCT/DE90/00747
  § 371 Date: Mar. 10, 1992
  § 102(e) Date: Mar. 10, 1992
[87] PCT Pub. No.: WO91/05988
  PCT Pub. Date: May 2, 1991

[30] Foreign Application Priority Data

Oct. 12, 1989 [DE] Fed. Rep. of Germany ....... 3934106

[51] Int. Cl.$^5$ ............................................ G01B 9/02
[52] U.S. Cl. ...................................... 356/352; 356/346
[58] Field of Search ............................. 356/352, 346

[56] References Cited

U.S. PATENT DOCUMENTS 4,999,013 3/1991 Zoechbauer ............... 356/352

Primary Examiner—Samuel A. Turner
Attorney, Agent, or Firm—Ralf H. Siegemund

[57] ABSTRACT

The invention relates to a process for Fabry-Perot spectroscopy using a spectrometer in the radiation path of which there is a radiation source, two successive Fabry-Perot interference filters through which the radiation passes, a blend of substances to be examined and a detector. The optical layer thickness of the first Fabry-Perot filter F1 is set to a given value and the optical layer thickness of the second Fabry-Perot filter F2 is modulated. The resultant interferogram as a function of the layer thickness is characteristic of the substance to be examined. The interferogram received at the detector D is converted by a mathematically transformation into a spectrum as a function of wave numbers.

1 Claim, 4 Drawing Sheets

METHOD FOR SPECTROSCOPY USING TWO FABRY-PEROT INTERFERENCE FILTERS

The invention relates to a method for Fabry-Perot spectroscopy under utilization of a spectrometer in accordance with the preamble of the claim.

Spectroscopic methods for measuring gases and liquids are very important in the fields of process and ecological technology. Accordingly, numerous measuring methods have been developed with which, from the point of view of central importance as far as the present case is concerned, those methods are considered which are suitable for liquid spectroscopy in the near infrared range, that is, about 1 $\mu$m to 3 $\mu$m wavelength.

In the following, several known methods for liquid spectroscopy will be considered as well as spectrometers operating in accordance with these methods.

The conventional method for liquid spectroscopy in the near infrared range uses a splitting up of the radiation by means of a grating monochromatic device. The detection of the radiation spectrum is usually carried out here by rotating the dispersion grating which requires a relatively expensive mechanical precision drive. This is particularly disturbing in those cases when measuring is carried out in a rather rough industrial environment. It is usually desirable to avoid mechanically moving parts entirely for such applications of the method and to use, rather, robust devices. Process spectrometers which are available on the market and pertaining to this type have to be classified in a cost or price category as having "high performance". For a simple, robust and economic spectrometer, which can still be operated in a rather rough industrial environment, one cannot use the aforementioned method.

Another method for liquid spectroscopy in the near infrared range is based upon splitting the radiation by means of interference filters. A device is known for the multi-component spectroscopy published in the journal "Automatisierungstechnische Praxis atp" Vol. 32, 1990 pp. 338–342. Herein at the most 14 different interference filters can be pivoted into the radiation path, which interference filters are arranged on the diaphragm-like wheels.

Here is it disadvantageous that indeed still mechanically moving parts are used for receiving the spectrum. Another disadvantage is that the entire spectral range is not available in a gapless fashion. The particular process spectrometer available on the market and pertaining to this type is therefore also to be classified in the "high performance" price category. Again, for a simple robust and economic spectrometer that is to be operated in a rough industrial environment, this described method cannot be used.

Another arrangement for receiving spectra is described in the European Patent Application EP OS 0 180 449. The dispersion of light is carried out here by means of an opto-acoustic crystal. The dispersed light is subsequently imaged upon a photo-detector array. Indeed, the arrangement does not use movable parts, it has, however, the disadvantage that the manufacture of the optic-acoustic crystal is very expensive from a technological as well as monetary point of view. In addition, one should consider that upon applying this device to the infrared spectrum, the detector array by itself is a very expensive item. Again, a simple and economic process spectrometer along this line is out of the question.

The multi-component process analyzer system disclosed in German Patent Application 35 25 490 also operates with a detector array. The dispersion of light is carried out in this case by means of a rather simple dispersing optic, however, the above-mentioned drawbacks concerning a detector array are also applicable here.

Another possibility of liquid analysis in the near infrared range is the so-called Fourier-transform infrared method.

German printed patent application 35 42 161 describes a two-beam interferometer of the Michelson type wherein, by means of a movable mirror, the interferogram of an unknown radiation to be analyzed is produced and converted in a detector into an electrical signal. Through subsequent Fourier transformation, one obtains the radiation spectrum.

The described device has the disadvantage that for producing the interferogram, a relatively expensive precision mirror-drive is needed. Again, this described interferometer cannot be considered applicable as a simple, robust and economical spectrometer.

U.S. Pat. No. 4,525,067 describes a method and a Fabry-Perot spectrometer operating in accordance with that method for a high resolution spectroscopy of line radiators. This method employs a dual Fabry-Perot device. The optical layer thickness of the first Fabry-Perot filter is adjusted to a fixed value where the optical layer thickness of the second Fabry-Perot filter is modulated by a value in accordance with the optical layer thickness of the first Fabry-Perot filter being equal to one fourth of the wave length.

Thus is accomplished a modulation of the radiation line to be examined between a maximum and a minimum value which improves the (algebraic) product of light intensity and resolution.

The described method has the disadvantage that it is suitable only for high resolution spectroscopy of individual radiation lines within a narrowly limited spectral range, and not for receiving the entire liquid spectrum of a comparatively broad spectral range.

It is an object of the present invention to provide a method for Fabry-Perot spectroscopy by means of a compact spectrometer which permits receiving the spectrum of a liquid or the spectrum of gaseous materials for process application particularly in the infrared spectral range. The spectrometer should not use expensive mechanical adjusting devices for the optics.

The object of the invention is accomplished by the method steps set forth in the characterizing part of the claim.

The proposed method is based on the consideration that only a relatively small spectral resolution is necessary for the liquid analysis in the near infrared radiation range (about 1 $\mu$m to 3 $\mu$m). This spectral range encompasses the oscillation bands as far as harmonics combinations of oscillation bands are concerned, pertaining to the particular liquid which are in a relatively broad band with little structure.

Therefore, it suffices to receive a spectrum with a resolution of about 20 to 40. Here, the term resolution is understood to be the quotient of wavelength and the wavelength difference which is still recognizable by means of measuring technology. The resolution values 20 to 40 correspond to a wavelength difference of between 50 nanometers and 100 nanometers. Relatively few data points suffice for obtaining a multi-component analysis (For example, 20 data points corresponding to a wavelength difference of about 100 nanometers).

An interferometric measuring method is suggested which is not based on a two beam inteference but on a multi-beam interference. This is accomplished through a Fabry-Perot filter device having a transmitting characteristic without using mechanically movable parts.

The known construction of a Michelson interferometer and of a Fabry-Perot filter are explained with reference to FIG. 1, FIG. 2 and FIG .3.

An example using the method in accordance with the invention is explained on the basis of FIG. 4, FIG. 5, FIG. 6, FIG. 7 and FIG. 8. Herein illustrate FIG. 1 a Michelson interferometer in a schematic representation, FIG. 2. a Fabry-Perot filter being comprised of 2 parallel mirrors, FIG. 3. The transmission spectrum of a filter in accordance with FIG. 2, FIG. 4 and FIG. 5. Transmission spectra of a spectrometer operating in accordance with the method of the invention, FIG. 6 and FIG. 7. The radiation flux of a spectrometer operating in accordance with the method of the invention, and FIG. 8. An example of a spectrometer using two Fabry-Perot filters and operating in accordance with the method of the invention.

FIG. 1 illustrates the principle of the Michelson interferometer. The wide-band radiation emitted by radiation source L reaches a beam splitter T which transmits a portion of the radiation and reflects the other portion so that two interfering branches obtain. A mirror such as M1 and M2 is respectively associated with each branch which reflects the respective light back to the beam splitter. The mirror M2 is moveably arranged so that the length of the respectively associated interferometric arm is variable.

The two partial beams recombine again in the beam splitter T whereby a characteristic interferometric spectrum is produced. The recombined radiation passes through the cuvette or measuring cell K containing the blend of substances to be examined and impinges upon a detector D which converts the recombined radiation into an electrical signal.

The mirror M2 is moved during the measuring procedure from a point where the two interferometer branches are of equal length, to a point where the branches have a predetermined difference. The interferogram received during mirror movement by the detector is converted by means of an evaluating device E into a radiation spectrum by operation of a Fourier transformation. In the case of a length difference zero between the interferometer branches, there appears the so-called center burst in the interferogram which means all wave lengths are amplified to a maximum degree during this particular branch position. The maximum length difference between the two branches which is the maximum mirror path is proportional to the spectral resolution of the system.

Figure 2:
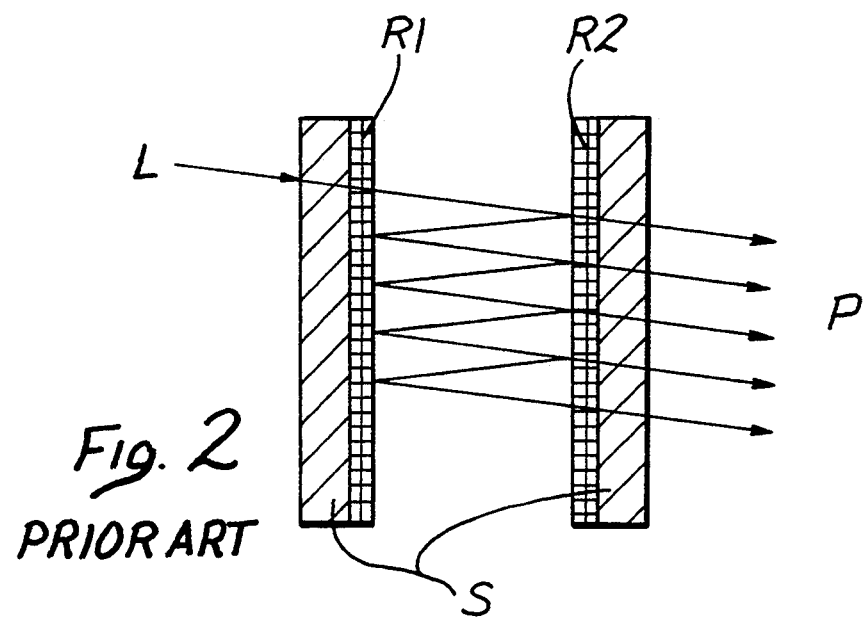

The Fabry-Perot filter shown in FIG. 2 is comprised of two plane parallel, partially transparent mirrors R1 and R2, which have been deposited on a light transparent substratum S and include an air layer. Each beam from a radiation source L is split through multiple reflection at the mirror surface into numerous parallel beams P of constant phase difference which parallel beams are combined by means of a not illustrated optical detector in a plane containing a plate to provide the desired interference phenomena.

Corresponding to the known Airy formulas, which provide the intensity distribution of the interferences at layers bounded by plane-parallel strata one can tune the wave length by changing the optical layer thickness (which is the product of mirror distance and index of refraction of the material within the mirror).

Figure 3:
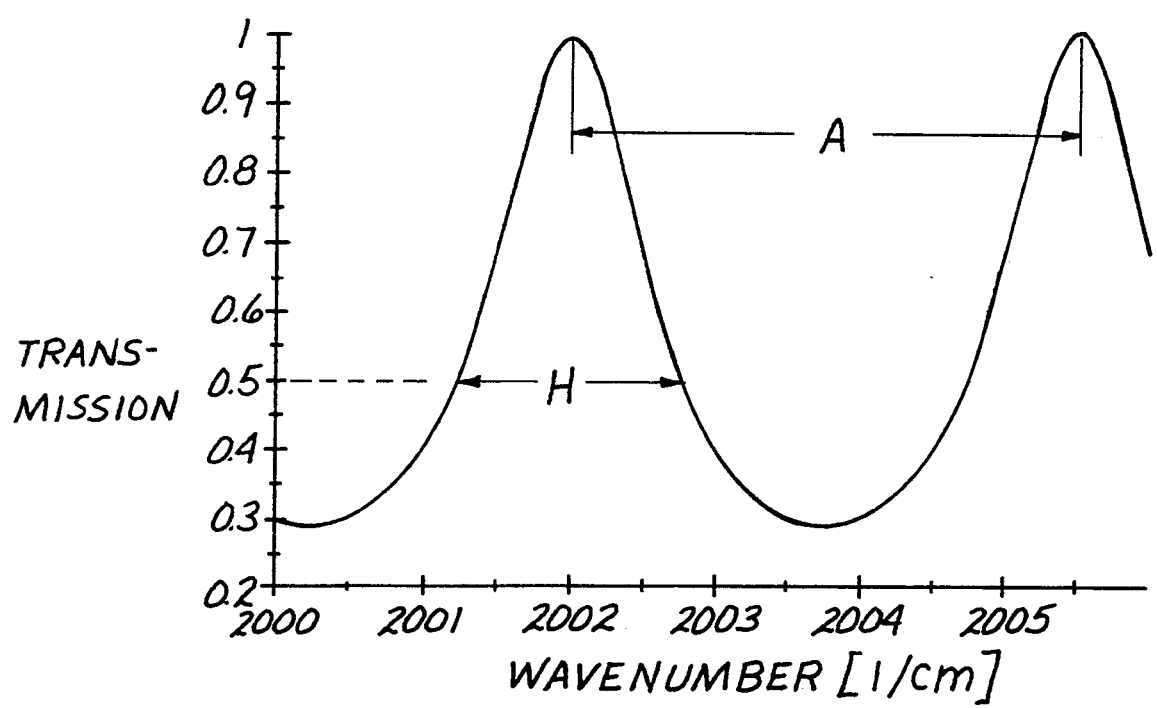

FIG. 3 illustrates an example of the transmission spectrum of a Fabry-Perot filter with an approximate 30% degree of reflection of the mirror and an optical layer thickness of about 380 $\mu$m in dependence upon the wave number. The distance A between two interference maxima is usually designated to be the free spectral range. This distance is inversely proportional to the distance between the two mirrors R1 and R2.

An important parameter for the spectrum resolution of a Fabry-Perot filter is the so-called "finesse" which is the ratio of the distance A between interference maxima and the half value width—distance H in FIG. 3—of an interference maximum. The finesse can be adjusted by adjusting the degree of reflection of the mirror whereby a high degree of reflection leads to a high finesse.

The obtainable spectral resolution of the filter thus depends upon the degree of reflection of the two mirrors R1 and R2 and upon the layer thickness. For a high spectral resolution, the degree of reflection and/or the optical layer thickness has to be large.

Electro-optical, accousto-optical, thermo-optical and piezo-electric methods are used for tuning without using mechanically moving parts.

In the case of electro-optical and accousto-optical methods, the index of refraction of the material between the mirrors is varied electro-optically and accousto-optically respectively. In the case of the thermo-optical method, the distance of the mirror (thickness of the material) as well as the index of refraction of that material is controlled through changes in temperature.

In the case of the piezo-electrical method, the mirror distance is directly controlled.

Upon comparing the Michelson interferometer with a tunable Fabry-Perot filter, then a length difference of zero of the interferometer branches in the Michelson interferometer corresponds to a mirror distance zero in the Fabry-Perot interferometer, however, a mirror distance zero is for principal reasons not attainable.

The solution of this problem obtains from the proposed method by means of an optical series arrangement of two tunable Fabry-Perot filters which is denoted in the following dual FP. The transmission spectrum of a dual FP results from superimposing the transmission spectrum of the two individual filters upon each other.

Figure 4:
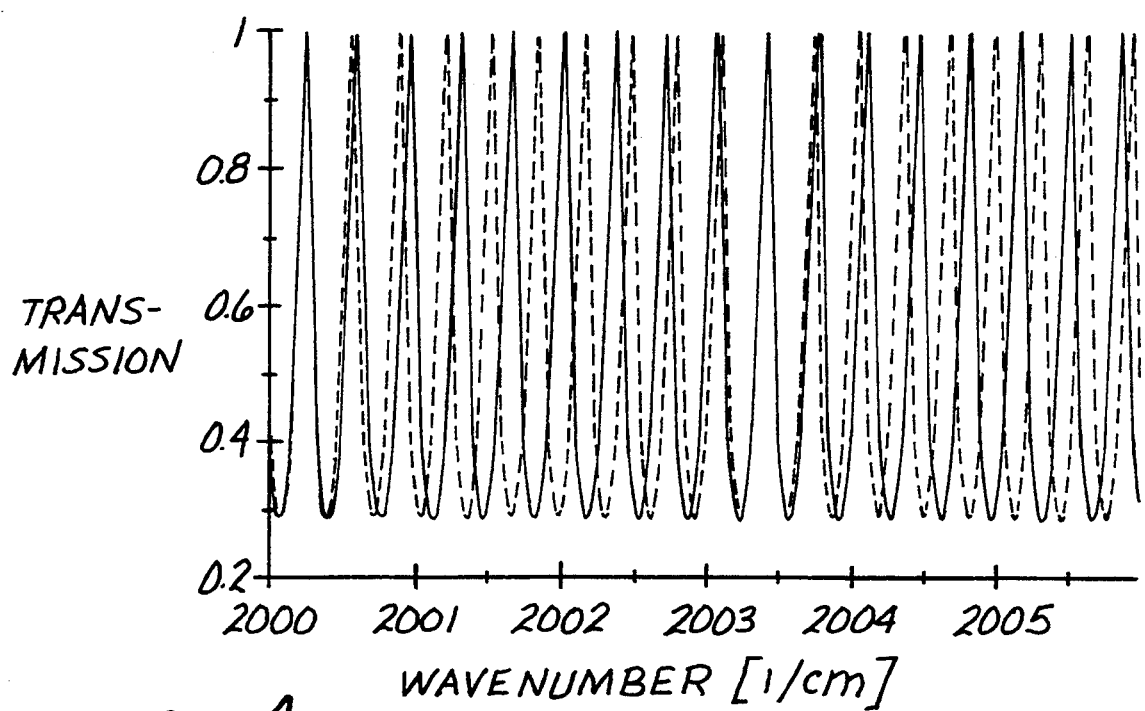

FIG. 4 illustrates an example of the spectrums of 2 Fabry-Perot filters with the transmission proper dependent upon the wave number. The thickness of the first Fabry-Perot filter is 4000 micrometer (solid line) and the thickness of the second one is 4400 micrometer (dotted line). The free spectral ranges of the two Fabry-Perot filters thus differ by 10% so that the transmission spectrum of the Fabry- Perot filters are in fact in-phase again after ten interference maxima.

Figure 5:
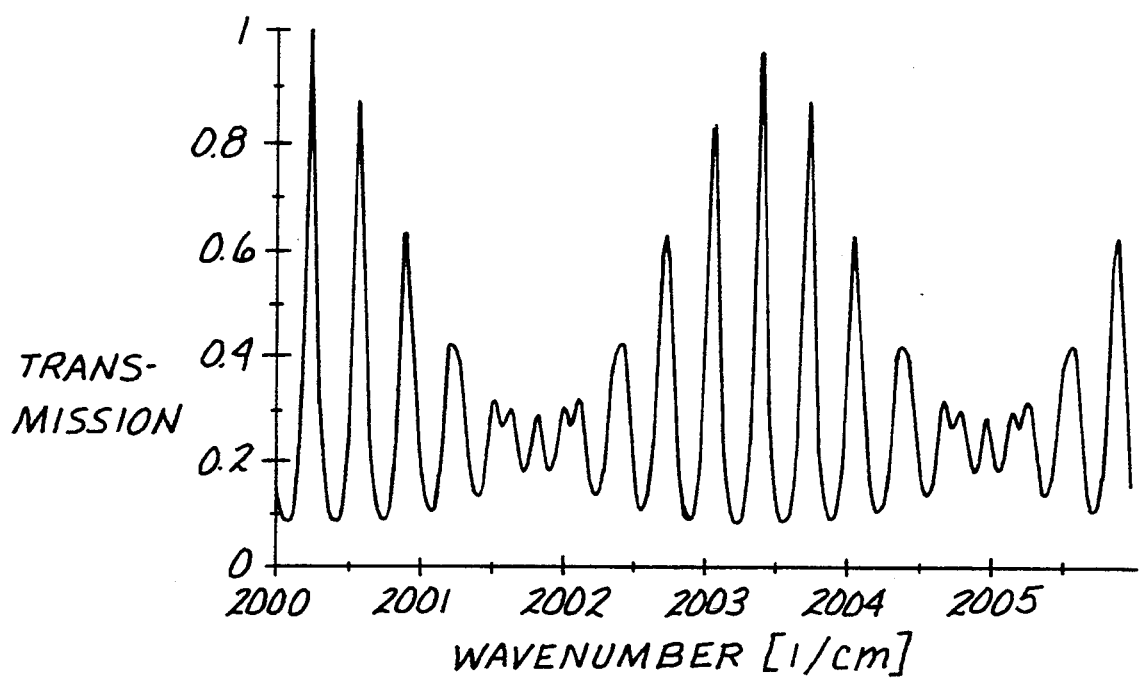

FIG. 5 illustrates the superpositioning of the transmission spectra of two Fabry-Perot filters.

The resulting envelope permits recognition of the fact that two successive filters operate like a single Fabry-Perot interferometer whose free spectral range is ten times as large as the free spectral range of the original free spectral range of the individual Fabry-Perot filter. The dual FP thus operates like a single Fabry-Perot filter with a thickness of 400 $\mu$m. That in turn means that the effective thickness of the dual FP is exactly equal to the difference in layer thickness of the two Fabry-Perot filters.

Upon reducing the difference in layer thickness, the free spectral range of the dual FP increases accordingly. In the case of a layer thickness difference of zero corresponding to the effective thickness of zero in the dual FP, there results an infinitely large free spectral range. In this case, then, the envelope vanishes because the transmission spectrum of the two Fabry-Perot filters are exactly in phase. But the dual FP proposed originally for increasing the resolution is in fact and in a surprising manner a Fabry-Perot filter by means of which an effective layer thickness can be produced between zero and any desired value.

The method here proposed thus does not utilize any fine structure of the dual FP as far as its potential high resolution is concerned; rather, the resulting envelope is used which operates on the basis of a low effective thickness of a rather poorly resolving Fabry-Perot filter.

As explained, the dual Fabry-Perot permits production of an effective optical layer thickness of zero. This then means that nothing is in the way of producing an interferogram that is analogous to the operation of an Michelson interferometer.

For purposes of illustration, the dual FP is first operated by receiving narrow-band radiation of wavelength λ, and the transmission function of the dual FP is recorded by means of the detector D in dependence upon the effective optical layer thickness variation. The two Fabry-Perot filters are now tuned so that they have exactly the same optical layer thickness, which means the effective thickness of the dual FP is zero. For receiving the transmission function of the filter arrangement, the optical layer thickness of the one Fabry-Perot filter is varied.

Figure 6:
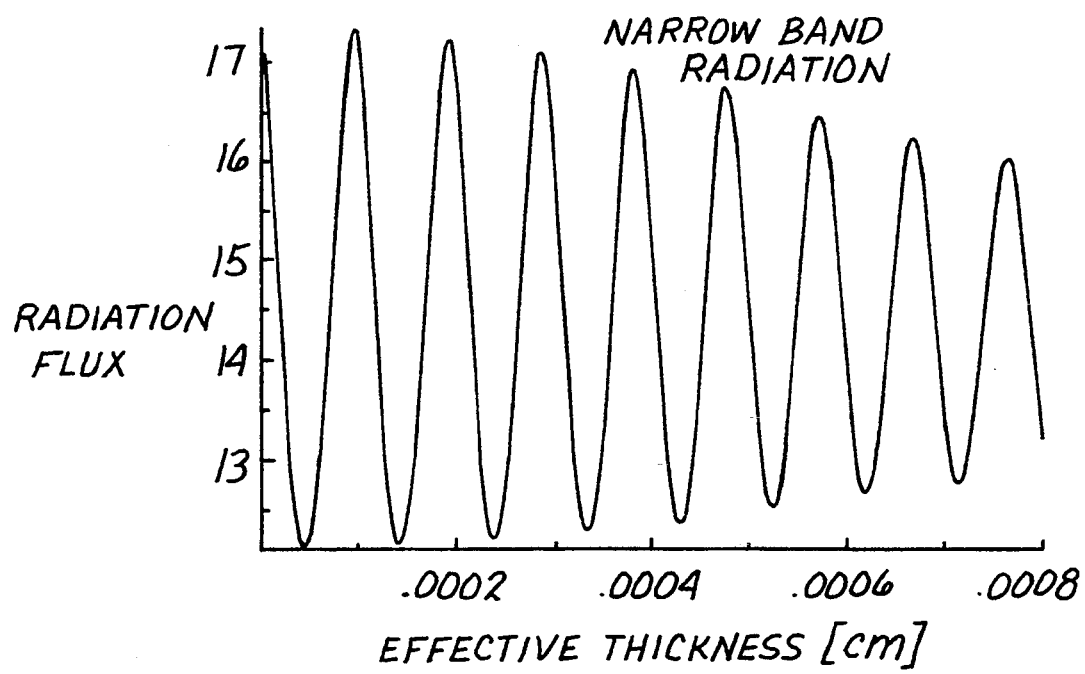
Figure 7:
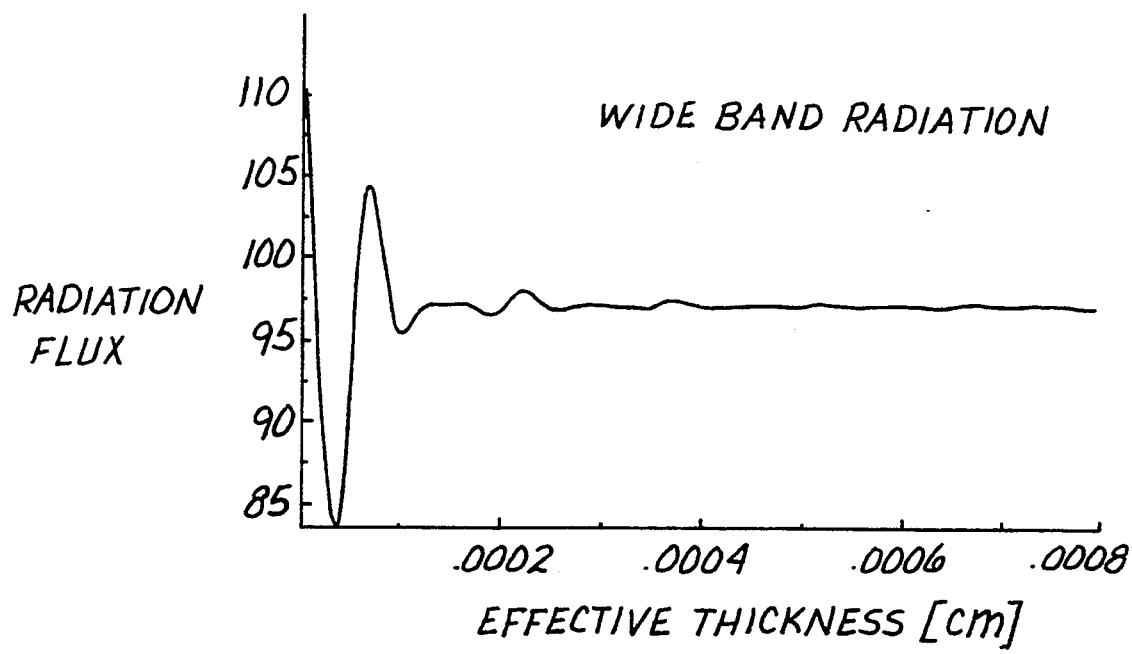

FIG. 6 illustrates the radiation flux Φ in dependence upon the effective thickness of a dual F-P which is to be interpreted as follows:

The first maximum of the radiation flux Φ is obtained for the effective thickness of zero. The first minimum results when the effective thickness has the value λ4*n, hernia n is the index of refraction of the material between the mirrors of the tunable Fabry-Perot filter. The maximum thereafter results from an effective thickness of λ/2*n. Here, then, the two interference spectra of the two Fabry-Perot filters are shifted by exactly one interference order. The minimum thereafter is obtained for an effective thickness of 0.75*λ/n and etc. This demonstrates that the relation is identical with that of a Michelson interferometer. Now if the dual FP receives broad-band radiation, the radiation flux Φ obtains as shown in FIG. 7. Also here one can see the complete analogy to the Michelson interferometer.

As far as a tunable Fabry-Perot filter is concerned, they are preferably electrically or thermically tunable Fabry-Perot filters as shown in older German Patent Applications P38 12 334.7 corresponding to U.S. Pat. No. 4,999,013; P 3923831.8 corresponding to U.S. Pat. No. 5,059,023 and German patent application P 3925692.8 corresponding to U.S. application Ser. No. 562 226 filed Aug. 30, 1990, now U.S. Pat. No. 5,218,422.[1] These references describe Fabry-Perot filters which are electrically or thermally tuned because their characteristic interference spectrum depends upon the optical layer thickness. A Fabry-Perot filter can, depending upon the configuration, include a plate made of electrooptically or thermal-optically active material or may be comprised of a cell filled with a double refracting liquid crystal.

[1] U.S. patent data have been added as per the footnote in the German case

The optical layer thickness of the first Fabry-Perot filter is adjusted to a fixed value while the optical layer thickness of the second Fabry-Perot filter is electrically or thermally varied continuously over a particular range of values. The desired range of spectrum results from the mathematical transformation of the interferogram produced by the detector whereby preferably a Fourier transformation is used.

Figure 8:
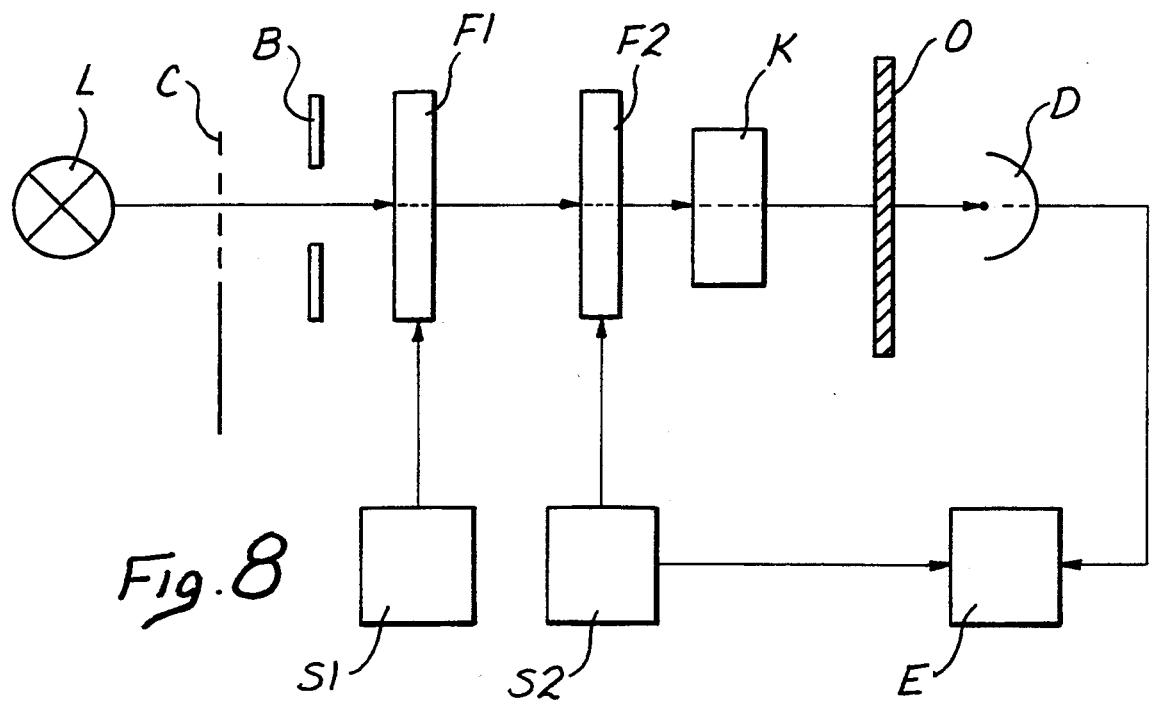

In the following an example will be explained with reference to FIG.8 using a spectrometer operating in accordance with the inventive method.

Broad-band light coming from a radiation source L is modulated by a chopper C and reaches the diaphragm B by means of which the interferometric evaluating range is restricted to a middle range of the radiation near the optical axis. Downstream is a first Fabry-Perot filter F1 which is comprised either of an electro optically active plate or of a thermo optically active plate or of a cell filled with a liquid crystal.

The Fabry-Perot filter F1 is electrically or thermally adjusted by means of a control unit S1 to obtain a particular optical layer thickness. Downstream from the filter F1 is arranged the Fabry-Perot filter F2 whose optical layer thickness is continuously varied electrically or thermally by means of a control unit S2.

In the case of a thermal optical variant, the temperature may be acquired through a thin film resistance which is directly placed on the Fabry-Perot filter.

Downstream in the radiation path there is the measuring path K which includes the blend of substances to be examined. The measuring path K may be realized by a cuvette. An objective lens O is placed downstream from the measuring path.

Finally the radiation is detected by means of the detector D and converted into an electrical signal in the signal evaluating device E. A Fourier transformation is produced by means of the evaluating device E which also calculates the concentration of the individual components of the blend of substances.

I claim:

1. Method for Fabry-Perot spectroscopy using a spectrometer the radiation path of which being provided with a radiation source, two successive Fabry-Perot interference filters through which the radiation passes, a blend of substances to be examined, and a detector for receiving radiation flux having passed through the filters and the blend, said Fabry-Perot interference filters having been adjusted to the same optical layer thickness, the optical layer thickness of one of the Fabry-Perot interference filters is continually varied by modulation, the improvement comprising producing an interferogram of an envelope (FIG. 5) of a transmission curve which envelope results from superpositioning of the Airy-functions of the two Fabry-Perot interference filters, whereby the envelope represents the difference in the optical layer thickness of the two Fabry-Perot interference filters, receiving a radiation flux having passed through the filters and the blend, by means of the detector and over a broad band in order to make use of the envelope part of the transmission curves; and mathematically converting the interferogram received by the detector into a spectrum as a function of the wave number.

* * * * *